US012572904B2

(12) United States Patent
Mu et al.

(10) Patent No.: US 12,572,904 B2
(45) Date of Patent: Mar. 10, 2026

(54) DIGITAL CURRENCY MANAGEMENT METHOD AND SYSTEM

(71) Applicant: Digital Currency Institute, The People's Bank of China, Beijing (CN)

(72) Inventors: Changchun Mu, Beijing (CN); Gang Di, Beijing (CN); Xinyu Zhao, Beijing (CN); Peidong Cui, Beijing (CN); Ting Wang, Beijing (CN); Yongchao Bian, Beijing (CN)

(73) Assignee: Digital Currency Institute, The People's Bank of China, Beijing (CN)

( * ) Notice: Subject to any disclaimer, the term of this patent is extended or adjusted under 35 U.S.C. 154(b) by 135 days.

(21) Appl. No.: 18/287,029

(22) PCT Filed: Apr. 15, 2022

(86) PCT No.: PCT/CN2022/086997
§ 371 (c)(1),
(2) Date: Oct. 16, 2023

(87) PCT Pub. No.: WO2022/218400
PCT Pub. Date: Oct. 20, 2022

(65) Prior Publication Data
US 2024/0193557 A1 Jun. 13, 2024

(30) Foreign Application Priority Data
Apr. 16, 2021 (CN) .......................... 202110414585.1

(51) Int. Cl.
*G06Q 20/06* (2012.01)
*G06Q 20/10* (2012.01)
(Continued)

(52) U.S. Cl.
CPC ........... *G06Q 20/065* (2013.01); *G06Q 20/10* (2013.01); *G06Q 20/381* (2013.01);
(Continued)

(58) Field of Classification Search
CPC ............. G06Q 20/065; G06Q 20/3825; G06Q 20/3829; G06Q 20/401; G06Q 20/10;
(Continued)

(56) References Cited

U.S. PATENT DOCUMENTS

| | | | | |
|---|---|---|---|---|
| 10,783,501 B1* | 9/2020 | Ramanathan | ...... | G06Q 20/0655 |
| 2019/0034888 A1* | 1/2019 | Grassadonia | ........ | G06Q 20/065 |
| 2020/0042998 A1 | 2/2020 | Mendhi et al. | | |

FOREIGN PATENT DOCUMENTS

| | | |
|---|---|---|
| CN | 105354747 A | 2/2016 |
| CN | 110599140 A | 12/2019 |

(Continued)

OTHER PUBLICATIONS

Rt "Central Bank Digital Currency Research Report Design of DCEP", Dec. 30, 2019, 17 pages (Year: 2019).*

(Continued)

*Primary Examiner* — James D Nigh
(74) *Attorney, Agent, or Firm* — The Sun IP Law

(57) ABSTRACT

The disclosure relates to the technical field of computers. Disclosed are a digital currency management method, apparatus and system. A specific implementation of the method includes: sending one or more first digital currencies to a first currency management apparatus corresponding to a first client, where the one or more first digital currencies belong to one or more second currency management apparatuses different from the first currency management apparatus; and receiving a second digital currency, which is generated by the first currency management apparatus according to the one or more first digital currencies, where the denomination of the second digital currency is equal to the sum of denominations of the one or more first digital currencies.

12 Claims, 4 Drawing Sheets

(51) Int. Cl.
|        |           |
|--------|-----------|
| *G06Q 20/38* | (2012.01) |
| *G06Q 20/40* | (2012.01) |
| *G06Q 40/02* | (2023.01) |

(52) U.S. Cl.
CPC ... *G06Q 20/3821* (2013.01); *G06Q 20/38215* (2013.01); *G06Q 20/3825* (2013.01); *G06Q 20/3829* (2013.01); *G06Q 20/401* (2013.01); *G06Q 20/405* (2013.01); *G06Q 40/02* (2013.01); *G06Q 2220/00* (2013.01)

(58) Field of Classification Search
CPC ............. G06Q 20/381; G06Q 20/3821; G06Q 20/38215; G06Q 20/405; G06Q 2220/00; G06Q 30/06; G06Q 40/02; G06Q 40/04
USPC .......................................................... 705/71
See application file for complete search history.

(56) References Cited

FOREIGN PATENT DOCUMENTS

| CN | 110852729 A | * | 2/2020 | ......... G06Q 20/3674 |
|----|-------------|---|--------|------------------------|
| CN | 110852730 A | * | 2/2020 | ........... G06Q 20/065 |
| CN | 112508556 A |   | 3/2021 | |
| CN | 112633875 A | * | 4/2021 | ............. G06Q 40/04 |
| CN | 114529279 A | * | 5/2022 | ............. G06Q 40/03 |

OTHER PUBLICATIONS

Xu "A brief analysis of the central bank's digital currency DC/EP/ dual offline payment scenarios and solutions", retrieved from https:// www.mpaypass.com.cn/news/201912/06094420.html, Dec. 12, 2019, 16 pages (Year: 2019).*
Allen et al. Design Choices for Central Bank Digital Currency: Policy and Technical Considerations, Jul. 23, 2020, 109 pages (Year: 2020).*
CN 112633875 English Translation PE2E Search (Year: 2025).*
CN 112633875 English Translation Espacenet (Year: 2025).*
CN 112633875 English Translation WIPO (Year: 2025).*
CN 114529299 English Translation (Year: 2025).*
CN 110852729 English Translation (Year: 2025).*
CN 110852730 English Translation (Year: 2025).*
The search report of counterpart EP application No. 22787622.4 issued on Jul. 18, 2024.

* cited by examiner

Fig. 1

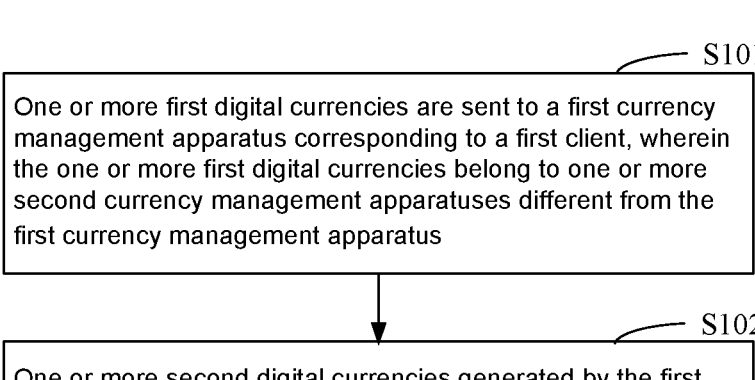

S101

One or more first digital currencies are sent to a first currency management apparatus corresponding to a first client, wherein the one or more first digital currencies belong to one or more second currency management apparatuses different from the first currency management apparatus

S102

One or more second digital currencies generated by the first currency management apparatus according to the one or more first digital currencies are received, wherein the sum of the denominations of the one or more second digital currencies is equal to the sum of denominations of the one or more first digital currencies

Fig. 2

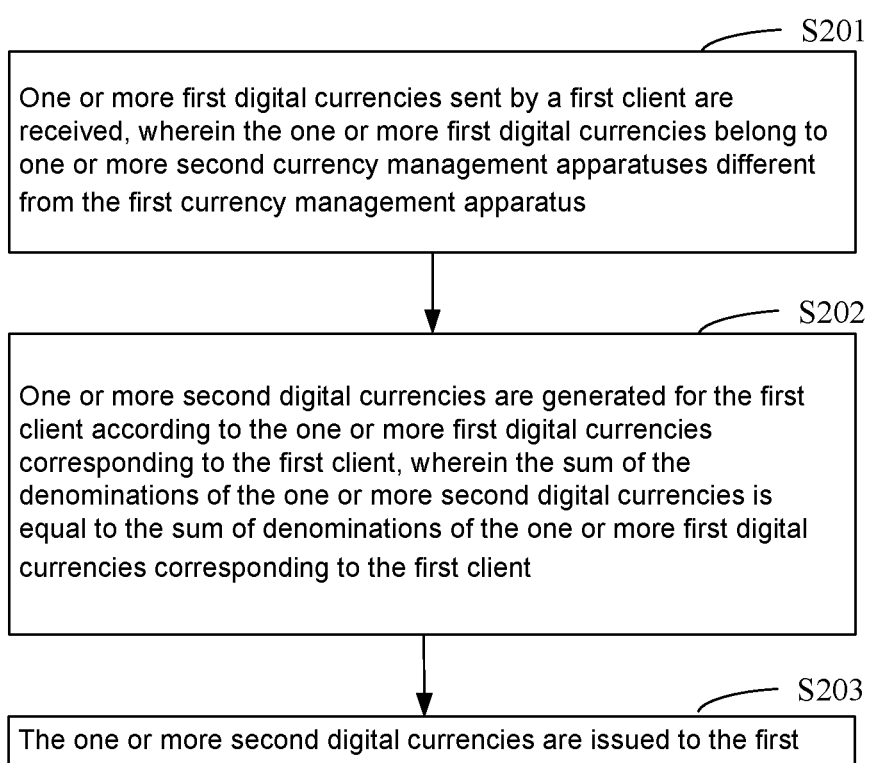

S201

One or more first digital currencies sent by a first client are received, wherein the one or more first digital currencies belong to one or more second currency management apparatuses different from the first currency management apparatus

S202

One or more second digital currencies are generated for the first client according to the one or more first digital currencies corresponding to the first client, wherein the sum of the denominations of the one or more second digital currencies is equal to the sum of denominations of the one or more first digital currencies corresponding to the first client

S203

The one or more second digital currencies are issued to the first client

Fig. 3

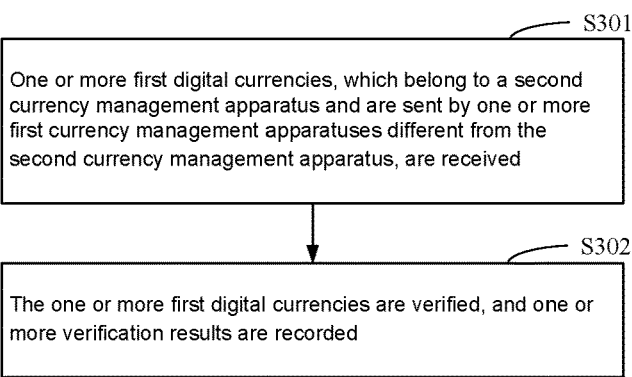

One or more first digital currencies, which belong to a second currency management apparatus and are sent by one or more first currency management apparatuses different from the second currency management apparatus, are received          S301

The one or more first digital currencies are verified, and one or more verification results are recorded          S302

Fig. 4

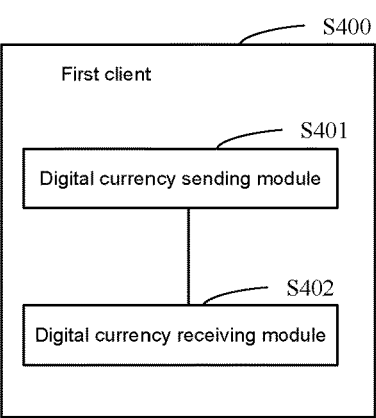

First client          S400

Digital currency sending module          S401

Digital currency receiving module          S402

Fig. 5

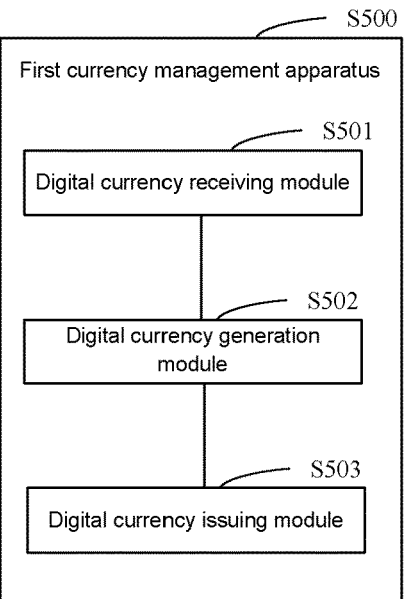

First currency management apparatus          S500

Digital currency receiving module          S501

Digital currency generation module          S502

Digital currency issuing module          S503

DIGITAL CURRENCY MANAGEMENT METHOD AND SYSTEM

CROSS-REFERENCE TO RELATED APPLICATION

The disclosure claims priority to Chinese Patent Application No. 202110414585.1 filed on Apr. 16, 2021 and entitled "Digital Currency Management Method and System", the disclosure of which is hereby incorporated by reference in its entirety as part or all of the disclosure.

TECHNICAL FIELD

The disclosure relates to technical field of computers, and in particular, to a digital currency management method and system.

BACKGROUND

In the era of digital economy, because of characteristics of low costs and convenience, digital currencies have received increasing attention from banks as well as consumers in various countries; and using the digital currencies for payments is then the key to realizing the circulation and application of the digital currencies.

Different from traditional paper currencies, the digital currencies may belong to different digital currency management mechanisms. That is, the digital currencies are issued by different digital currency management mechanisms, such that one user during an actual payment process may receive the digital currencies that respectively belong to different digital currency management mechanisms and are sent by different users. In order to improve the convenience of using the digital currencies for transactions, on the basis of the fact that a user receives the digital currencies respectively belonging to different digital currency management mechanisms, the digital currencies need to be converted into digital currencies that are issued by the corresponding digital currency management mechanism, so as to improve the liquidity of the digital currencies.

SUMMARY

In view of this, embodiments of the disclosure provide a digital currency management method and system, which can realize rapid digital currency exchange on the basis of the fact that a client receives digital currencies respectively belonging to different digital currency management mechanisms, such that the circulation of the digital currencies is improved.

In order to achieve the above objectives, a first aspect of an embodiment of the disclosure provides a digital currency management method, which is applied to a first client, and includes the following operations.

One or more first digital currencies are sent to a first currency management apparatus corresponding to a first client, wherein the one or more first digital currencies belong to one or more second currency management apparatuses different from the first currency management apparatus.

One or more second digital currencies generated by the first currency management apparatus according to the one or more first digital currencies are received, wherein the sum of the denominations of the one or more second digital currencies is equal to the sum of denominations of the one or more first digital currencies.

As at least one alternative embodiment, the one or more first digital currency are one or more digital currencies that are received by the first client during offline transaction.

In order to achieve the above objectives, a second aspect of an embodiment of the disclosure provides a digital currency management method, which is applied to a first currency management apparatus, and includes the following operations.

One or more first digital currencies sent by a first client are received, wherein the one or more first digital currencies belong to one or more second currency management apparatuses different from the first currency management apparatus.

One or more second digital currencies are generated for the first client according to the one or more first digital currencies corresponding to the first client, wherein the sum of the denominations of the one or more second digital currencies is equal to the sum of denominations of the one or more first digital currencies corresponding to the first client.

The one or more second digital currencies are issued to the first client.

As at least one alternative embodiment, the method further includes the following operation.

Before the one or more second digital currencies are generated for the first client according to the one or more first digital currencies corresponding to the first client, the one or more first digital currencies are verified, so as to generate the one or more second digital currencies for the first client when verification is passed.

As at least one alternative embodiment, the method further includes the following operation.

The one or more first digital currencies are respectively sent to the one or more second currency management apparatuses to which the one or more first digital currencies belong, so as to enable the one or more second currency management apparatuses to verify the one or more first digital currencies.

As at least one alternative embodiment, the one or more second currency management apparatuses verify the one or more first digital currencies according to one or more of the following:

circulation identifiers of the one or more first digital currencies, signature information of the one or more first digital currencies, transaction vouchers of the one or more first digital currencies, and denominations of the one or more first digital currencies, wherein the transaction vouchers of the one or more first digital currencies indicate transaction information corresponding to the one or more first digital currencies.

In order to achieve the above objectives, a third aspect of an embodiment of the disclosure provides a digital currency management method, which is applied to a second currency management apparatus, and includes the following operations.

One or more first digital currencies, which belong to a second currency management apparatus and are sent by one or more first currency management apparatuses different from the second currency management apparatus, are received.

The one or more first digital currencies are verified, and one or more verification results are recorded.

As at least one alternative embodiment, the one or more first digital currencies are verified according to one or more of the following:

circulation identifiers of the one or more first digital currencies, signature information of the one or more first digital currencies, transaction vouchers of the one or more first digital currencies, and denominations of the one or more first digital currencies, wherein the transaction vouchers of the one or more first digital currencies indicate transaction information corresponding to the one or more first digital currencies.

As at least one alternative embodiment, the operation of verifying the one or more first digital currencies according to the denominations of the one or more first digital currencies includes the following operation.

The sum of denominations of the one or more first digital currencies is calculated, to determine whether the sum of the denominations of the one or more first digital currencies is consistent with the sum of denominations of one or more digital currencies that are recorded by the second currency management apparatus and have the same circulation identifiers as the one or more first digital currencies.

In order to achieve the above objectives, a fourth aspect of an embodiment of the disclosure provides a first client for digital currency management. The first client includes a digital currency sending module and a digital currency receiving module.

The digital currency sending module is configured to send one or more first digital currencies to a first currency management apparatus corresponding to a first client, wherein the one or more first digital currencies belong to one or more second currency management apparatuses different from the first currency management apparatus.

The digital currency receiving module is configured to receive one or more second digital currencies generated by the first currency management apparatus according to the one or more first digital currencies, wherein the sum of the denominations of the one or more second digital currencies is equal to the sum of denominations of the one or more first digital currencies.

In order to achieve the above objectives, a fifth aspect of an embodiment of the disclosure provides a first currency management apparatus for digital currency management. The first currency management apparatus includes a digital currency receiving module, a digital currency generation module, and a digital currency issuing module.

The digital currency receiving module is configured to receive one or more first digital currencies sent by a first client, wherein the one or more first digital currencies belong to one or more second currency management apparatuses different from the first currency management apparatus.

The digital currency generation module is configured to generate one or more second digital currencies for the first client according to the one or more first digital currencies corresponding to the first client, wherein the sum of the denominations of the one or more second digital currencies is equal to the sum of denominations of the one or more first digital currencies corresponding to the first client.

The digital currency issuing module is configured to issue the one or more second digital currencies to the first client.

In order to achieve the above objectives, a sixth aspect of an embodiment of the disclosure provides a second currency management apparatus for digital currency management. The second currency management apparatus includes a digital currency receiving module and a digital currency verification module.

The digital currency receiving module is configured to receive one or more first digital currencies, which belong to a second currency management apparatus and are sent by one or more first currency management apparatuses different from the second currency management apparatus.

The digital currency verification module is configured to verify the one or more first digital currencies, and record one or more verification results.

In order to achieve the above objectives, a seventh aspect of an embodiment of the disclosure provides a digital currency management system, which includes: a first client, a first currency management apparatus, and a second currency management apparatus.

The first client is configured to send one or more first digital currencies to the first currency management apparatus corresponding to the first client, where the one or more first digital currencies belong to one or more second currency management apparatuses different from the first currency management apparatus; and receive one or more second digital currencies generated by the first currency management apparatus according to the one or more first digital currencies, where the sum of the denominations of the one or more second digital currencies is equal to the sum of denominations of the one or more first digital currencies.

The first currency management apparatus is configured to receive one or more first digital currencies sent by the first client, where the one or more first digital currencies belong to one or more second currency management apparatuses different from the first currency management apparatus; generate one or more second digital currencies for the first client according to the one or more first digital currencies corresponding to the first client, where the sum of the denominations of the one or more second digital currencies is equal to the sum of denominations of the one or more first digital currencies corresponding to the first client; and issue the one or more second digital currencies to the first client.

The second currency management apparatus is configured to receive one or more first digital currencies, which belong to the second currency management apparatus and are sent by one or more first currency management apparatuses different from the second currency management apparatus; and verify the one or more first digital currencies, and record one or more verification results.

In order to achieve the above objectives, an eighth aspect of an embodiment of the disclosure provides an electronic device for digital currency management. The electronic device includes: one or more processors; and a storage apparatus, configured to store one or more programs. When the one or more programs are executed by the one or more processors, the one or more processors are enabled to implement any one of the above digital currency management methods.

In order to achieve the above objectives, a ninth aspect of an embodiment of the disclosure provides a computer-readable medium, which has a computer program stored thereon. Any one of the above digital currency management methods is implemented when the program is executed by a processor.

Further effects of non-customary optional methods are described below in combination with specific implementations.

BRIEF DESCRIPTION OF THE DRAWINGS

Drawings are used to better understand the disclosure, and are not intended to improperly limit the disclosure.

FIG. 1 is a schematic diagram of main processes of a digital currency management method applied to a first client according to an embodiment of the disclosure.

FIG. 2 is a schematic diagram of main processes of a digital currency management method applied to a first currency management apparatus according to an embodiment of the disclosure.

FIG. 3 is a schematic diagram of main processes of a digital currency management method applied to a second currency management apparatus according to an embodiment of the disclosure.

FIG. 4 is a schematic diagram of main modules of a first client for digital currency management according to an embodiment of the disclosure.

FIG. 5 is a schematic diagram of main modules of a first currency management apparatus for digital currency management according to an embodiment of the disclosure.

DETAILED DESCRIPTION OF THE EMBODIMENTS

Figure 6:
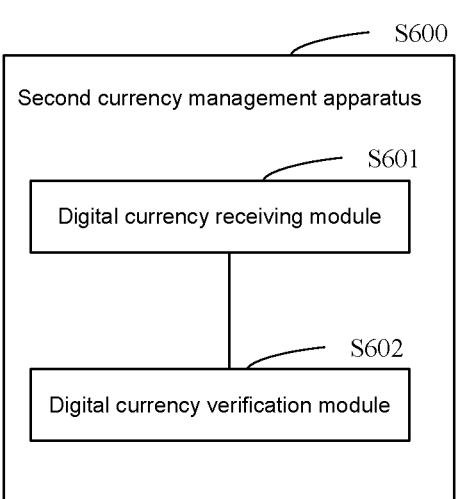
FIG. 6 is a schematic diagram of main modules of a second currency management apparatus for digital currency management according to an embodiment of the disclosure.

Exemplary embodiments of the disclosure are described in detail below with reference to the drawings, including various details of the embodiments of the disclosure to facilitate understanding, and should be regarded as merely exemplary. Thus, those of ordinary skill in the art shall understand that, variations and modifications can be made on the embodiments described herein, without departing from the scope and spirit of the disclosure. Likewise, for clarity and conciseness, descriptions of well-known functions and structures are omitted in the following description.

FIG. 1 is a schematic diagram of main processes of a digital currency management method applied to a first client according to an embodiment of the disclosure. As shown in FIG. 1, the digital currency management method may include the following steps.

At S101, one or more first digital currencies are sent to a first currency management apparatus corresponding to a first client, wherein the one or more first digital currencies belong to one or more second currency management apparatuses different from the first currency management apparatus.

Digital currencies refer to currencies that may be used to replace paper currencies for various circulation operations. For example, the data currencies are used for payments, the transferring of digital currency owners, or the digital currencies are directly transferred. As at least one alternative embodiment, the digital currencies include one or more pieces of the following information: a circulation identifier of the digital currency, a currency management apparatus identifier to which the digital currency belongs, and the signature of a currency management apparatus. The circulation identifier of the digital currency refers to a unique circulation identifier (for example, a serial number) corresponding to the digital currency. The circulation identifier may be in the form of a character string, a two-dimensional code and a bar code, so as to facilitate the circulation of the digital currency. The one or more first digital currencies belonging to the one or more second currency management apparatuses means that the one or more first digital currencies are issued by the one or more second currency management apparatuses. That is, the one or more first digital currencies include information such as identifiers of the one or more second currency management apparatuses and signatures of the one or more second currency management apparatuses.

In an optional implementation, the first digital currency is a digital currency that is received by the first client during offline transaction. It is understandable that, the first client for transacting with other clients may be in an online state, that is, in a communication connection state with the first currency management apparatus; or may be in an offline state, that is, the communication connection with the first currency management apparatus is disconnected, such that the received one or more first digital currencies are unable to be sent in real time to the first currency management apparatus. Based on this, in order to ensure that the one or more first digital currencies received by the first client during an offline transaction are able to be processed timely, once the first client is in the online state, that is, once the communication connection is successfully established with the first currency management apparatus, the one or more first digital currencies during the offline transaction are sent to the first currency management apparatus, so as to enable the first currency management apparatus to directly generate one or more second digital currencies according to the one or more first digital currencies and issue the same to the first client, without cashing the one or more first digital currencies to the second currency management apparatuses to which the one or more first digital currencies belong, such that rapid exchange of the digital currencies belonging to the one or more second currency management apparatuses is realized, thereby improving the circulation of the digital currencies and the convenience of transactions.

In addition, with regard to receiving the one or more digital currencies when the first client is in the online state, the first client may send the received one or more first digital currencies to the first currency management apparatus according to actual situations, and may also regularly or irregularly send, to the first currency management apparatus, the one or more first digital currencies that have been received currently. For example, the one or more first digital currencies that have been received currently are sent every 1 hour, 5 hours or 24 hours, such that the first currency management apparatus conveniently processes the one or more first digital currencies in batches.

At S102, one or more second digital currencies generated by the first currency management apparatus according to the one or more first digital currencies are received, wherein the sum of the denominations of the one or more second digital currencies is equal to the sum of denominations of the one or more first digital currencies.

That is to say, after receiving the one or more first digital currencies belonging to the one or more second currency management apparatuses different from the first currency management apparatus and sent by the first client, the first currency management apparatus may directly generate one second digital currency belonging to the first currency management apparatus according to the sum of the denominations of the one or more first digital currencies, wherein the denominations of the second digital currencies is equal to the sum of the denominations of the one or more first digital currencies, and the one or more second digital currencies are issued to the first client. The first currency management apparatus may also directly generate, according to the sum of the denominations of the one or more first digital currencies, two or more second digital currencies belonging to the first currency management apparatus; and the sum of the denominations of the two or more second digital currencies is equal to the sum of the denominations of the one or more first digital currencies, and the two or more second digital currencies are issued to the first client.

Therefore, the first client may rapidly cash the one or more first digital currencies to the first currency management apparatus without waiting for the first currency management apparatus to cash the digital currencies to the second currency management apparatuses to which the one or more first digital currencies belong, thereby improving the circulation of the digital currencies and the convenience of transactions. As at least one alternative embodiment, for example, the denominations of four first digital currencies sent by the first client are respectively 5, 10, 20, and 50; then the first currency management apparatus directly generates the second digital currency with the denomination being 85 and issues the same to the first client; and two second digital currencies with the denominations being respectively 40 and 45 may also be generated and issued to the first client, or three second digital currencies with the denominations being respectively 30, 30, and 25 are generated and issued to the first client.

On the basis of the above embodiments, because the first client may send, to the first currency management apparatus, the one or more first digital currencies belonging to different second currency management apparatuses and received during the offline transaction or an online transaction, so as to receive the one or more second digital currencies that are directly generated by the first currency management apparatus according to the one or more first digital currencies, rapid exchange of the first digital currencies is realized, such that the circulation of the digital currencies and the use convenience of the digital currencies are improved.

Referring to FIG. 2, on the basis of the above embodiments, an embodiment of the disclosure provides a digital currency management method applied to a first currency management apparatus. The digital currency management method may include the following steps.

At S201, one or more first digital currencies sent by a first client are received, wherein the one or more first digital currencies belong to one or more second currency management apparatuses different from the first currency management apparatus.

At S202, one or more second digital currencies are generated for the first client according to the one or more first digital currencies corresponding to the first client, wherein the sum of the denominations of the one or more second digital currencies is equal to the sum of denominations of the one or more first digital currencies corresponding to the first client. As at least one alternative embodiment, for example, the denominations of four first digital currencies sent by the first client are still respectively 5, 10, 20, and 50; then the first currency management apparatus directly generates the second digital currency with the denomination being 85 and issues the same to the first client; and two second digital currencies with the denominations being respectively 40 and 45 may also be generated and issued to the first client, or three second digital currencies with the denominations being respectively 30, 30, and 25 are generated and issued to the first client.

In an optional implementation, before generating the one or more second digital currencies for the first client according to the one or more first digital currencies corresponding to the first client, the one or more first digital currencies are verified, so as to generate the one or more second digital currencies for the first client when verification is passed.

As at least one alternative embodiment, the first currency management apparatus may verify the one or more first digital currencies according to circulation identifiers or signature information of the one or more first digital currencies: determine whether the circulation identifiers of the one or more first digital currencies are legal circulation identifiers, so as to determine the legitimacy of a source of the digital currencies; or determine, according to identifiers of the currency management apparatuses indicated by the one or more first digital currencies, whether the identifiers of the currency management apparatuses belong to the legal second currency management apparatus, so as to verify the legitimacy of the source of the digital currencies; or verify the signatures of the currency management apparatuses included in the one or more first digital currencies. For example, the signatures of the currency management apparatuses are generated by using an asymmetric encryption algorithm, and then the first currency management apparatus may use a public key of the second currency management apparatus to perform signature verification on the signatures of the currency management apparatuses in the one or more first digital currencies, so as to verify the reliability of the signature information. Therefore, the legitimacy of the source of the one or more first digital currencies may be guaranteed, and the safe reliability of the one or more second digital currencies directly generated on the basis of the one or more first digital currencies may also be guaranteed.

At S203, the one or more second digital currencies are issued to the first client.

Based on this, the first client may directly use the one or more second digital currencies for transaction payments, such that the circulation of the digital currencies and the convenience of transactions are improved.

In an optional implementation, the method further includes: respectively sending the one or more first digital currencies to the one or more second currency management apparatuses to which the one or more first digital currencies belong, so as to enable the one or more second currency management apparatuses to verify the one or more first digital currencies.

It is understandable that, in order to enable the first client to rapidly cash the one or more first digital currencies to the first currency management apparatus, the first currency management apparatus directly generates the one or more second digital currencies without verifying the legitimacy of the one or more first digital currencies to the second currency management apparatuses to which the one or more first digital currencies belong. Therefore, in order to further guarantee the legitimacy of the one or more first digital currencies, so as to avoid the problem of double payments, after generating the one or more second digital currencies, the first currency management apparatus may send the one or more first digital currencies to the second currency management apparatuses to which the one or more first digital currencies belong, so as to verify the one or more first digital currencies, such that the second currency management apparatuses manage the one or more first digital currencies by means of tracing on the basis of the transaction vouchers or transaction information corresponding to the one or more first digital currencies when verification is not passed, so as to guarantee the security and legitimacy of digital currency transactions. The transaction voucher indicates one or more of identifiers (for example, public keys), transaction time, and transaction serial numbers of both transaction parties, which are involved in circulation of the one or more first digital currencies.

It is understandable that, the first currency management apparatus may correspond to a plurality of users, and may therefore receive the one or more first digital currencies sent by the first clients of the plurality of different users; and the one or more first digital currencies sent by the first clients of different users may belong to the same second currency management apparatus. Therefore, the first currency management apparatus may, in real time, regularly or irregularly, send, according to the number of the one or more actually received first digital currencies belonging to the same second currency management apparatus, the one or more first digital currencies to the second currency management apparatus to which the one or more first digital currencies belong, so as to enable the second currency management apparatus to verify the first digital currencies.

More specifically, the one or more second currency management apparatuses verify the one or more first digital currencies according to one or more of the following: circulation identifiers of the one or more first digital currencies, signature information of the one or more first digital currencies, transaction vouchers of the one or more first digital currencies, and denominations of the one or more first digital currencies. The transaction vouchers of the one or more first digital currencies indicate transaction information corresponding to the one or more first digital currencies.

Referring to FIG. 3, on the basis of the above embodiments, an embodiment of the disclosure provides a digital currency management method applied to a second currency management apparatus. The method may include the following steps.

At S301, one or more first digital currencies, which belong to a second currency management apparatus and are sent by one or more first currency management apparatuses different from the second currency management apparatus, are received.

At S302, the one or more first digital currencies are verified, and one or more verification results are recorded.

In an optional implementation, the second currency management apparatuses may verify the one or more first digital currencies according to one or more of the following: circulation identifiers of the one or more first digital currencies, signature information of the one or more first digital currencies, transaction vouchers of the one or more first digital currencies, and denominations of the one or more first digital currencies. The transaction vouchers of the one or more first digital currencies indicate transaction information corresponding to the one or more first digital currencies.

The step of verifying the one or more first digital currencies according to the denominations of the one or more first digital currencies includes: calculating the sum of the denominations of the one or more first digital currencies, to determine whether the sum of the denominations of the one or more first digital currencies is consistent with the sum of denominations of one or more digital currencies that are recorded by the second currency management apparatus and have the same circulation identifiers as the one or more first digital currencies. Therefore, the second currency management apparatus may determine, according to the sum of the denominations of the issued digital currencies and the sum of the denominations of the received one or more first digital currencies, whether the same digital currency is spent repeatedly, that is, double payment. Based on this, if the second currency management apparatus determines that the double payment of the one or more first digital currencies exists, a source of illegal spending of the one or more first digital currencies may be traced and monitored on the basis of information such as identifiers (for example, public keys), transaction time and transaction serial numbers of both transaction parties, which are involved in circulation of the first digital currencies indicated by the transaction vouchers of the one or more first digital currencies.

Further, by using the circulation identifiers of the one or more first digital currencies as an example, the second currency management apparatus may determine whether the circulation identifiers of the one or more first digital currencies are circulation identifiers that are recorded or stored in a digital currency record, so as to determine whether the one or more first digital currencies are digital currencies issued by the second currency management apparatus. Alternatively, by using the identifiers of the currency management apparatuses indicated by the one or more first digital currencies as an example, the second currency management apparatus may determine whether the identifiers of the currency management apparatuses belong to a legal second currency management apparatus, so as to verify the legitimacy of the source of the digital currencies. Alternatively, the signatures of the currency management apparatuses included in the one or more first digital currencies are verified. For example, the signatures of the currency management apparatuses are generated by using the asymmetric encryption algorithm, and then the first currency management apparatus may use a public key of the second currency management apparatus to which the one or more first digital currencies belong, to perform signature verification on the signatures of the currency management apparatuses in the one or more first digital currencies, so as to verify the reliability of the signature information. Alternatively, by using the transaction vouchers corresponding to the first digital currencies as an example, the second currency management apparatus may determine the legitimacy of digital currency circulation according to identifiers (for example, public keys), transaction time and transaction serial numbers of both transaction parties, which are involved in circulation of the first digital currencies indicated by the transaction vouchers.

Referring to FIG. 4, on the basis of the above embodiments, an embodiment of the disclosure provides a first client 400 for digital currency management. The first client 400 includes a digital currency sending module 401 and a digital currency receiving module 402.

The digital currency sending module 401 is configured to send one or more first digital currencies to a first currency management apparatus corresponding to a first client, wherein the one or more first digital currencies belong to one or more second currency management apparatuses different from the first currency management apparatus.

The digital currency receiving module 402 is configured to receive one or more second digital currencies generated by the first currency management apparatus according to the one or more first digital currencies, wherein the sum of the denominations of the one or more second digital currencies is equal to the sum of denominations of the one or more first digital currencies.

In an optional implementation, the first digital currency is a digital currency that is received by the first client 400 during offline transaction.

Referring to FIG. 5, on the basis of the above embodiments, an embodiment of the disclosure provides a first currency management apparatus 500 for digital currency management. The first currency management apparatus includes a digital currency receiving module 501, a digital currency generation module 502, and a digital currency issuing module 503.

The digital currency receiving module 501 is configured to receive one or more first digital currencies sent by a first client, wherein the one or more first digital currencies belong to one or more second currency management apparatuses different from the first currency management apparatus.

The digital currency generation module 502 is configured to generate one or more second digital currencies for the first client according to the one or more first digital currencies corresponding to the first client, wherein the sum of the denominations of the one or more second digital currencies is equal to the sum of the denominations of the one or more first digital currencies corresponding to the first client.

The digital currency issuing module 503 is configured to issue the one or more second digital currencies to the first client.

In an optional implementation, the digital currency generation module 502 is further configured to perform the following operation.

Before the one or more second digital currencies are generated for the first client according to the one or more first digital currencies corresponding to the first client, the one or more first digital currencies are verified, so as to generate the one or more second digital currencies for the first client when verification is passed.

In an optional implementation, the digital currency issuing module 503 is further configured to perform the following operation.

The one or more first digital currencies are respectively sent to the one or more second currency management apparatuses to which the one or more first digital currencies belong, so as to enable the one or more second currency management apparatuses to verify the one or more first digital currencies.

In an optional implementation, the one or more second currency management apparatuses verify the one or more first digital currencies according to one or more of the following: circulation identifiers of the one or more first digital currencies, signature information of the one or more first digital currencies, transaction vouchers of the one or more first digital currencies, and denominations of the one or more first digital currencies, wherein the transaction vouchers of the one or more first digital currencies indicate transaction information corresponding to the one or more first digital currencies.

Referring to FIG. 6, on the basis of the above embodiments, an embodiment of the disclosure provides a second currency management apparatus 600 for digital currency management. The second currency management apparatus includes a digital currency receiving module 601 and a digital currency verification module 602.

The digital currency receiving module 601 is configured to receive one or more first digital currencies, which belong to a second currency management apparatus and are sent by one or more first currency management apparatuses different from the second currency management apparatus.

The digital currency verification module 602 is configured to verify the one or more first digital currencies, and record one or more verification results.

In an optional implementation, the digital currency verification module 602 is configured to verify the one or more first digital currencies according to one or more of the following: circulation identifiers of the one or more first digital currencies, signature information of the one or more first digital currencies, transaction vouchers of the one or more first digital currencies, and denominations of the one or more first digital currencies, wherein the transaction vouchers of the one or more first digital currencies indicate transaction information corresponding to the one or more first digital currencies.

In an optional implementation, the digital currency verification module being configured to verify the one or more first digital currencies according to the denominations of the one or more first digital currencies includes the following operation.

The sum of denominations of the one or more first digital currencies is calculated, to determine whether the sum of the denominations of the one or more first digital currencies is consistent with the sum of denominations of one or more digital currencies that are recorded by the second currency management apparatus and have the same circulation identifiers as the one or more first digital currencies.

Figure 7:
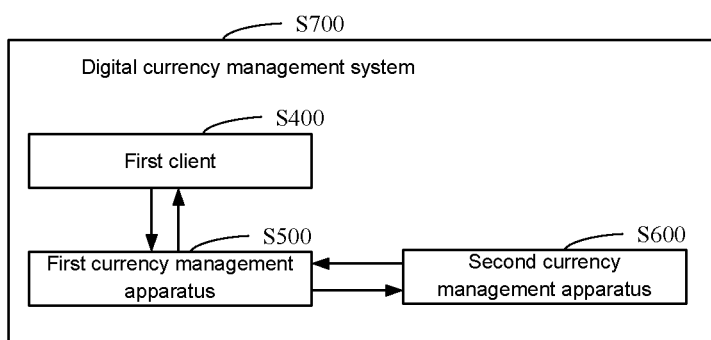
FIG. 7 is a schematic diagram of a main structure of a digital currency management system according to an embodiment of the disclosure.

Referring to FIG. 7, on the basis of the above embodiments, an embodiment of the disclosure provides a digital currency management system 700, which includes: a first client 400, a first currency management apparatus 500, and a second currency management apparatus 600.

The first client 400 is configured to send one or more first digital currencies to the first currency management apparatus corresponding to the first client, where the one or more first digital currencies belong to one or more second currency management apparatuses different from the first currency management apparatus; and receive one or more second digital currencies generated by the first currency management apparatus according to the one or more first digital currencies, where the sum of the denominations of the one or more second digital currencies is equal to the sum of the denominations of the one or more first digital currencies.

The first currency management apparatus 500 is configured to receive one or more first digital currencies sent by the first client, where the one or more first digital currencies belong to one or more second currency management apparatuses different from the first currency management apparatus; generate one or more second digital currencies for the first client according to the one or more first digital currencies corresponding to the first client, where the sum of the denominations of the one or more second digital currencies is equal to the sum of denominations of the one or more first digital currencies corresponding to the first client; and issue the one or more second digital currencies to the first client.

The second currency management apparatus 600 is configured to receive one or more first digital currencies, which belong to the second currency management apparatus and are sent by one or more first currency management apparatuses different from the second currency management apparatus; and verify the one or more first digital currencies, and record one or more verification results.

Figure 8:
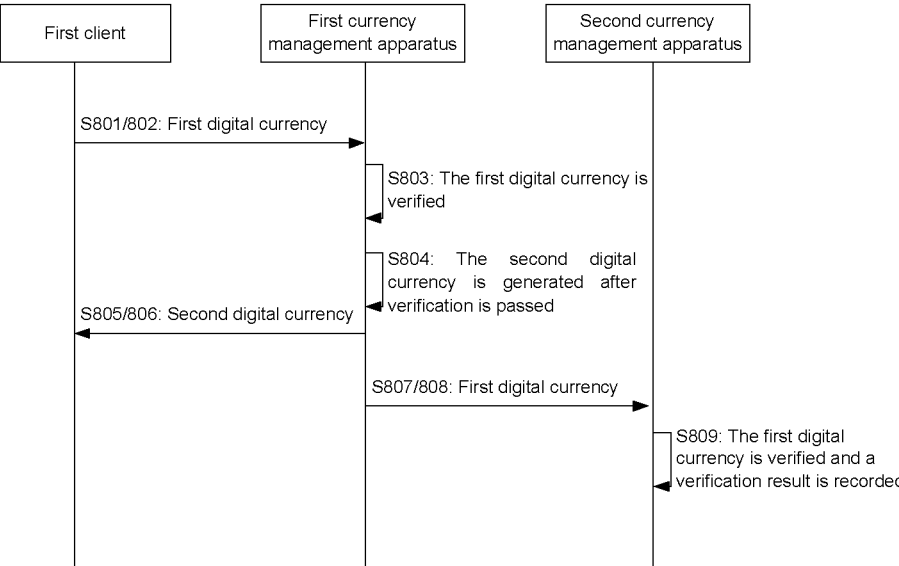
FIG. 8 is a schematic diagram of main processes of a digital currency management method applied to a digital currency management system according to an embodiment of the disclosure.

Referring to FIG. 8, on the basis of the above embodiments, an embodiment of the disclosure provides a digital currency management method applied to a digital currency management system 700. The method may specifically include the following step.

At S801, a first client sends one or more first digital currencies to a first currency management apparatus corresponding to a first client, wherein the one or more first digital currencies belong to one or more second currency management apparatuses different from the first currency management apparatus. Once being online, the first client is triggered to send the one or more first digital currencies received during an offline transaction to the first currency management apparatus.

At S802, the first currency management apparatus receives the one or more first digital currencies sent by the first client.

At S803, the first currency management apparatus verifies the one or more first digital currencies. For example, the one or more first digital currencies are verified according to circulation identifiers of the one or more first digital currencies, identifiers of currency management apparatuses included in the one or more first digital currencies, and signature information of the currency management apparatuses.

At S804, the first currency management apparatus generates one or more second digital currencies when verification of the first digital currencies is passed, wherein the sum of the denominations of the one or more second digital currencies is consistent with the sum of denominations of the one or more first digital currencies. That is to say, the first currency management apparatus may directly generate the one or more second digital currencies corresponding to the one or more first digital currencies and issue the same to the first client without cashing the one or more first digital currencies to the second currency management apparatuses to which the one or more first digital currencies belong, such that the first client may rapidly exchange the digital currencies to the first currency management apparatus, thereby improving the circulation of the digital currencies and the convenience of transactions.

At S805, the first currency management apparatus issues the one or more second digital currencies to the first client.

At S806, the first currency management apparatus respectively issues the one or more first digital currencies to one or more second currency management apparatuses to which the one or more first digital currencies belong.

At S807, the second currency management apparatuses receive the one or more first digital currencies sent by the first currency management apparatus.

At S808, the second currency management apparatuses verify the received one or more first digital currencies, and record one or more verification results. As at least one alternative embodiment, the one or more first digital currencies may be verified according to one or more pieces of information of the circulation identifiers of the one or more first digital currencies, the signature information of the one or more first digital currencies, the transaction vouchers of the one or more first digital currencies, the denominations of the one or more first digital currencies, and the identifiers of the currency management apparatuses of the first digital currencies. Based on this, the problem of whether the double payment of the first digital currencies exists may be monitored, such that the security and reliability of digital currency transactions are improved.

Figure 9:
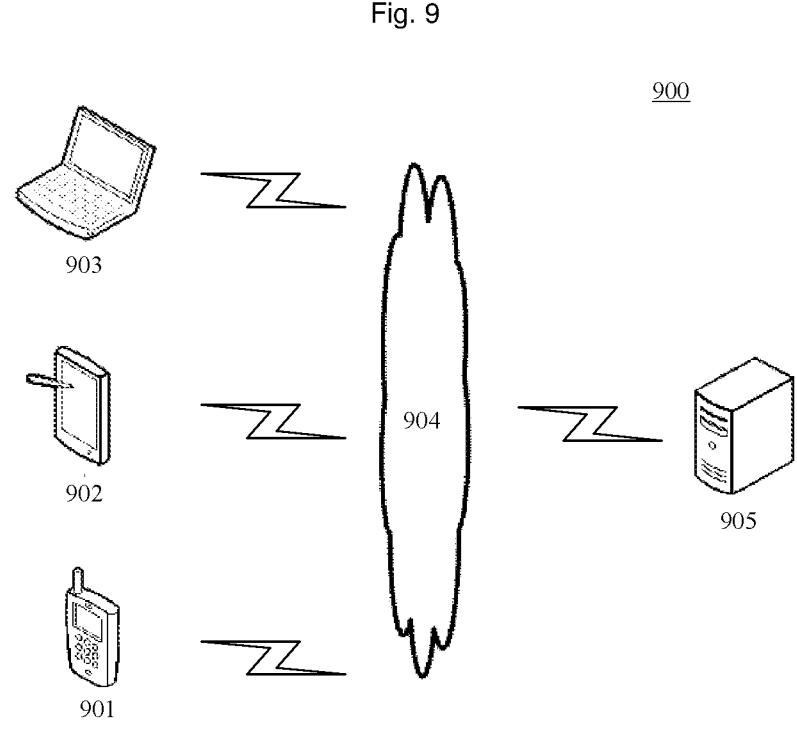
FIG. 9 is an architecture diagram of an exemplary system to which an embodiment of the disclosure may be applied.

FIG. 9 shows an exemplary system architecture 900 that may use the digital currency management method or a digital currency management apparatus according to the embodiments of the disclosure.

As shown in FIG. 9, a system architecture 900 may include terminal devices 901, 902 and 903, a network 904 and a server 905. The network 904 is configured to provide a medium for communication links between the terminal devices 901, 902 and 903 and the server 905. The network 904 may include various connection types, such as wired or wireless communication links, or fiber optic cables.

A user may use the terminal devices 901, 902 and 903 to interact with the server 905 by means of the network 904, so as to receive or sent transaction information, a digital currency payment request, or a first digital currency, including, but is not limited to, smartphones, tablets, laptops, and desktops.

The server 905 may be a server that provides various services, for example, processing one or more first digital currencies sent by the user using the terminal devices 901, 902 and 903, and feeding back processing results such as second digital currencies to the terminal devices.

It is to be noted that, the digital currency management method applied to a first currency management apparatus provided in the embodiments of the disclosure is generally executed by the server 905, and accordingly, the digital currency management apparatus is generally provided in the server 905.

It should be understood that, the number of the terminal devices, the networks and the servers in FIG. 9 is merely schematic. According to an implementation requirement, the terminal device, the network and the server may be in any number.

Figure 10:
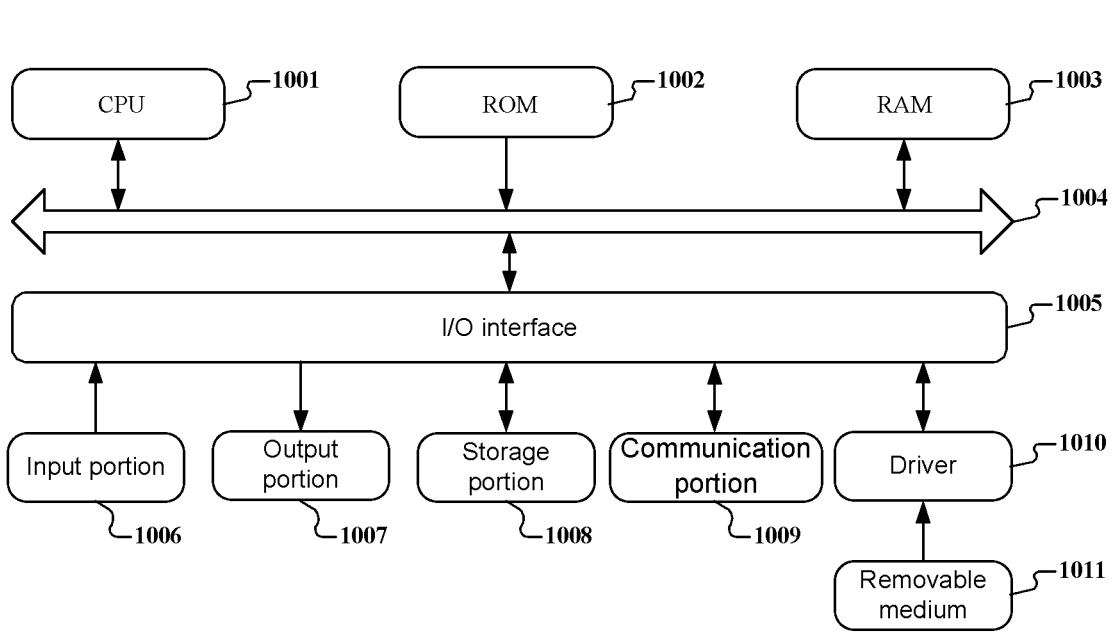
FIG. 10 is a schematic structural diagram of a computer system of a terminal device or a server that adapts to implement the embodiments of the disclosure.

FIG. 10 is a schematic structural diagram of a computer system 1000 of a terminal device that adapts to implement the embodiments of the disclosure. The terminal device shown in FIG. 10 is only an example, and should not impose any limitations on the functionality and scope of use of embodiments of the disclosure.

As shown in FIG. 10, the computer system 1000 includes a Central Processing Unit (CPU) 1001. The CPU may perform various appropriate actions and processing operations according to a program stored in a Read-Only Memory (ROM) 1002 or a computer program loaded from a storage portion 1008 into a Random Access Memory (RAM) 1003. In the RAM 1003, various programs and data required for the operation of the system 1000 may also be stored. The CPU 1001, the ROM 1002, and the RAM 1003 are connected to each other by means of a bus 1004. An Input/Output (I/O) interface 1005 is also connected to the bus 1004.

The following components are connected to the I/O interface 1005: an input portion 1006 including a keyboard, a mouse, etc.; an output portion 1007 including a Cathode Ray Tube (CRT), a Liquid Crystal Display (LCD), a speaker, etc.; a storage portion 1008 including a hard disk, etc.; and a communication portion 1009 including a network interface card such as a Local Area Network (LAN) card and a modem. The communication portion 1009 performs communication processing via a network such as Internet. A driver 1010 is also connected to the I/O interface 1005 as needed. A removable medium 1011, such as a magnetic disk, an optical disk, a magneto-optical disk, and a semiconductor memory, is installed on the driver 1010 as needed, such that a computer program read therefrom is installed into the storage portion 1008 as needed.

In particular, the process described above with reference to a flowchart may be implemented as a computer software program according to the disclosed embodiments of the disclosure. For example, the disclosed embodiments of the disclosure include a computer program product including a computer program carried on a computer-readable medium, and the computer program includes a program code for executing the method shown in the flowchart. In such an embodiment, the computer program may be downloaded and installed from the network via the communication portion 1009, and/or from the removable medium 1011. The computer program is executed by the CPU 1001 to execute the functions limited in the system of the disclosure.

It is to be noted that, the computer-readable medium shown in the disclosure may be a computer-readable signal medium or a computer-readable storage medium or any combination thereof. The computer-readable storage medium, for example, may be, but not limited to, an electrical, magnetic, optical, electromagnetic, infrared, or semiconductor system, apparatus or device, or a combination of any of the above. More specific examples of the computer-readable storage medium may include, but are not limited to, an electrical connection member including one or more wires, a portable computer disk, a hard disk, an RAM, an ROM, an Erasable Programmable Read-Only Memory (EPROM), a flash memory, optical fiber, a portable Compact Disc Read-Only Memory (CD-ROM), an optical storage device, a magnetic storage device, or any appropriate combination thereof. In the disclosure, the computer-readable storage medium may be any tangible medium that includes or stores a program. The program may be used by or in combination with an instruction execution system, an apparatus, or a device. In the disclosure, the computer-readable signal medium may include a data signal that is propagated in a base band or propagated as a part of a carrier wave, which carries a computer-readable program code therein. The propagated data signal may adopt a plurality of forms including, but not limited to, an electromagnetic signal, an optical signal, or any suitable combination of the above. The computer-readable signal medium may also be any computer-readable medium other than the computer-readable storage medium. The computer-readable medium may send, propagate or transmit the program that is used by or in combination with the instruction execution system, the apparatus, or the device. The program code in the computer-readable medium may be transmitted with any proper medium, including, but not limited to, radio, a wire, an optical cable, Radio Frequency (RF), etc., or any proper combination thereof.

The flowcharts and block diagrams in the drawings illustrate probably implemented system architectures, functions, and operations of the system, method, and computer program product according to various embodiments of the disclosure. On this aspect, each block in the flowcharts or block diagrams may represent a module, a program segment, or a portion of a code, which includes one or more executable instructions for implementing the specified logic functions. It is also to be noted that, in certain alternative implementations, the functions marked in the blocks may also be realized in a sequence different from those marked in the drawings. For example, two blocks shown in succession may, in fact, be executed substantially in parallel, and sometimes in a reverse sequence, depending upon the functionality involved. It is further to be noted that, each block in the block diagrams or the flowcharts and a combination of the blocks in the block diagrams or the flowcharts may be implemented by a dedicated hardware-based system configured to execute a specified function or operation, or may be implemented by a combination of special hardware and a computer instruction.

The modules described in the embodiments of the disclosure may be implemented by means of software or hardware. The modules described may also be provided in a processor, for example, a processor may be described as a first currency management apparatus for digital currency management. The first currency management apparatus includes a digital currency receiving module, a digital currency generation module, and a digital currency issuing module. The names of the modules do not constitute a limitation on the module itself in some cases, for example, the digital currency issuing module may also be described as "a module configured to issue the one or more second digital currencies to the first client".

As another aspect, the disclosure further provides a computer-readable medium, which may be included in the device described in the above embodiments, or may also be present separately and not fitted into the device. The above computer-readable medium carries one or more programs. When the one or more above programs are executed by the device, the device is enabled to include: sending one or more first digital currencies to the first currency management apparatus corresponding to the first client, where the one or more first digital currencies belong to one or more second currency management apparatuses different from the first currency management apparatus; and receiving one or more second digital currencies generated by the first currency management apparatus according to the one or more first digital currencies, where the sum of the denominations of the one or more second digital currencies is equal to the sum of denominations of the one or more first digital currencies.

According to the technical solutions of the embodiments of the disclosure, because the first client may send, to the first currency management apparatus, the one or more first digital currencies belonging to different second currency management apparatuses and received during the offline transaction or an online transaction, so as to receive the one or more second digital currencies that are directly generated by the first currency management apparatus according to the first digital currencies, rapid exchange of the one or more first digital currencies is realized, such that the circulation of the digital currencies and the use convenience of the digital currencies are improved.

The foregoing specific implementations do not constitute limitations on the protection scope of the disclosure. Those skilled in the art should understand that, various modifications, combinations, sub-combinations and substitutions may be made according to design requirements and other factors. Any modifications, equivalent replacements, improvements and the like made within the spirit and principle of the disclosure shall fall within the scope of protection of the disclosure.

What is claimed is:

1. A method for transaction verification between a client and a first currency management apparatus, comprising:
   the client conducting a transaction with another client in an offline state with respect to the first currency management apparatus to obtain one or more first digital currencies, wherein the one or more first digital currencies are issued by one or more second currency management apparatuses different from the first currency management apparatus, and each of the one or more first digital currencies is configured with a first digital currency denomination, a circulation identifier, an identifier of the corresponding second currency management apparatus, a signature of the corresponding second currency management apparatus, and a transaction receipt, wherein the transaction receipt is configured with identification information of transaction parties involved in a circulation of the corresponding first digital currency, a transaction time, and a transaction serial number;
   in response to switching from the offline state to a connected state with the first currency management apparatus, the client sending the one or more first digital currencies to the first currency management apparatus;

the first currency management apparatus receiving the one or more first digital currencies, verifying whether the circulation identifiers are valid, verifying whether the identifiers belong to a legitimate second currency management apparatus, and verifying the signatures using a public key of the second currency management apparatus;

after successful verification, generating, by the first currency management apparatus, one or more second digital currencies for the client, wherein a first sum of denominations of the one or more second digital currencies is equal to a second sum of denominations of the one or more first digital currencies, and each of the one or more second digital currencies is configured with a second digital currency denomination, a circulation identifier, an identifier of the first currency management apparatus, and a signature of the first currency management apparatus;

sending the one or more second digital currencies to the client and the second currency management apparatus;

the second currency management apparatus calculating a third sum of denominations of the one or more first digital currencies, and determining whether the third sum matches a fourth sum of denominations of digital currencies recorded by the second currency management apparatus that have same circulation identifier as the one or more first digital currencies; and in response to the third sum and the fourth sum being inconsistent, the second currency management apparatus obtaining identification information of transaction parties that illegally spent the one or more first digital currencies, based on the identifiers of the transaction parties, the transaction time, and the transaction serial number indicated in the transaction receipt of the one or more first digital currencies.

2. The method for transaction verification between a client and a first currency management apparatus as claimed in claim 1, further comprising:

respectively sending the one or more first digital currencies to the one or more second currency management apparatuses to which the one or more first digital currencies belong, so as to enable the one or more second currency management apparatuses to verify the one or more first digital currencies.

3. A digital currency management method, applied to a second currency management apparatus, comprising:

receiving one or more first digital currencies, which belong to the second currency management apparatus and are sent by one or more first currency management apparatuses different from the second currency management apparatus, wherein the one or more first digital currencies are digital currencies that are received by a client during offline transaction, and the one or more first digital currencies are sent to the one or more first currency management apparatuses once the first client establishes a communication connection with the one or more first currency management apparatuses, each of the one or more first digital currencies is configured with a circulation identifier, an identifier of the second currency management apparatus, a signature of the second currency management apparatus, and a transaction voucher; and verifying the one or more first digital currencies, and recording one or more verification results;

wherein the one or more first digital currencies are verified according to their circulation identifiers, their identifiers, their signatures, their transaction vouchers, and their denominations, the transaction vouchers indicate transaction information corresponding to the one or more first digital currencies, and the signatures are generated by using an asymmetric encryption algorithm;

wherein verifying the one or more first digital currencies further comprises:

calculating a first sum of denominations of the one or more first digital currencies, and determining whether the first sum is consistent with a second sum of denominations of one or more digital currencies that are recorded by the second currency management apparatus and have same circulation identifiers as the one or more first digital currencies, so as to identify a problem of double payments of the one or more first digital currencies; and verifying whether the circulation identifiers are valid, verifying whether the identifiers belong to a legitimate second currency management apparatus, and verifying the signatures using a public key of the second currency management apparatus.

4. The digital currency management method as claimed in claim 3, wherein verifying whether the circulation identifiers are valid further comprises: determining whether the circulation identifiers are circulation identifiers that are recorded or stored in a digital currency record, so as to determine whether the one or more first digital currencies are digital currencies issued by the second currency management apparatus.

5. The digital currency management method as claimed in claim 3, wherein the one or more first digital currencies being verified according to the transaction vouchers comprises: determining legitimacy of digital currency circulation according to identification information, transaction time and transaction serial numbers of transaction parties involved in circulation of the one or more first digital currencies as indicated by the transaction vouchers.

6. The digital currency management method as claimed in claim 3, wherein verifying whether the identifiers belong to a legitimate second currency management apparatus further comprises: determining whether the identifiers indicated by the one or more first digital currencies belong to an identifier of a legal currency management apparatus, so as to verify legitimacy of sources of the one or more first digital currencies.

7. An electronic device for digital currency management, comprising:

one or more processors; and a storage apparatus, configured to store one or more programs, wherein when the one or more programs are executed by the one or more processors, the one or more processors are enabled to implement following actions:

a client conducting a transaction with another client in an offline state with respect to a first currency management apparatus to obtain one or more first digital currencies, wherein the one or more first digital currencies are issued by one or more second currency management apparatuses different from the first currency management apparatus, and each of the one or more first digital currencies is configured with a first digital currency denomination, a circulation identifier, an identifier of the corresponding second currency management apparatus, a signature of the corresponding second currency management apparatus, and a transaction receipt, wherein the transaction receipt is configured with identification information of transaction parties involved in a circulation of the corresponding first digital currency, a transaction time, and a transaction serial number;

in response to switching from the offline state to a connected state with the first currency management apparatus, the client sending the one or more first digital currencies to the first currency management apparatus;

the first currency management apparatus receiving the one or more first digital currencies, verifying whether the circulation identifiers are valid, verifying whether the identifiers belong to a legitimate second currency management apparatus, and verifying the signatures using a public key of the second currency management apparatus;

after successful verification, generating, by the first currency management apparatus, one or more second digital currencies for the client, wherein a first sum of denominations of the one or more second digital currencies is equal to a second sum of denominations of the one or more first digital currencies, and each of the one or more second digital currencies is configured with a second digital currency denomination, a circulation identifier, an identifier of the first currency management apparatus, and a signature of the first currency management apparatus;

sending the one or more second digital currencies to the client and the second currency management apparatus;

the second currency management apparatus calculating a third sum of denominations of the one or more first digital currencies, and determining whether the third sum matches a fourth sum of denominations of digital currencies recorded by the second currency management apparatus that have same circulation identifier as the one or more first digital currencies; and in response to the third sum and the fourth sum being inconsistent, the second currency management apparatus obtaining identification information of transaction parties that illegally spent the one or more first digital currencies, based on the identifiers of the transaction parties, the transaction time, and the transaction serial number indicated in the transaction receipt of the one or more first digital currencies.

8. The electronic device for digital currency management as claimed in claim 7, wherein the one or more processors are further enabled to implement following actions: respectively sending the one or more first digital currencies to the one or more second currency management apparatuses to which the one or more first digital currencies belong, so as to enable the one or more second currency management apparatuses to verify the one or more first digital currencies.

9. A non-transitory medium, having a computer program stored thereon, wherein when the computer program is executed by a processor, the processor is enabled to implement following actions:

a client conducting a transaction with another client in an offline state with respect to a first currency management apparatus to obtain one or more first digital currencies, wherein the one or more first digital currencies are issued by one or more second currency management apparatuses different from the first currency management apparatus, and each of the one or more first digital currencies is configured with a first digital currency denomination, a circulation identifier, an identifier of the corresponding second currency management apparatus, a signature of the corresponding second currency management apparatus, and a transaction receipt, wherein the transaction receipt is configured with identification information of transaction parties involved in a circulation of the corresponding first digital currency, a transaction time, and a transaction serial number;

in response to switching from the offline state to a connected state with the first currency management apparatus, the client sending the one or more first digital currencies to the first currency management apparatus;

the first currency management apparatus receiving the one or more first digital currencies, verifying whether the circulation identifiers are valid, verifying whether the identifiers belong to a legitimate second currency management apparatus, and verifying the signatures using a public key of the second currency management apparatus;

after successful verification, generating, by the first currency management apparatus, one or more second digital currencies for the client, wherein a first sum of denominations of the one or more second digital currencies is equal to a second sum of denominations of the one or more first digital currencies, and each of the one or more second digital currencies is configured with a second digital currency denomination, a circulation identifier, an identifier of the first currency management apparatus, and a signature of the first currency management apparatus;

sending the one or more second digital currencies to the client and the second currency management apparatus;

the second currency management apparatus calculating a third sum of denominations of the one or more first digital currencies, and determining whether the third sum matches a fourth sum of denominations of digital currencies recorded by the second currency management apparatus that have same circulation identifier as the one or more first digital currencies; and in response to the third sum and the fourth sum being inconsistent, the second currency management apparatus obtaining identification information of transaction parties that illegally spent the one or more first digital currencies, based on the identifiers of the transaction parties, the transaction time, and the transaction serial number indicated in the transaction receipt of the one or more first digital currencies.

10. The non-transitory medium as claimed in claim 9, wherein the processor is further enabled to implement following actions:

respectively sending the one or more first digital currencies to the one or more second currency management apparatuses to which the one or more first digital currencies belong, so as to enable the one or more second currency management apparatuses to verify the one or more first digital currencies.

11. An electronic device for digital currency management, comprising:

one or more processors; and a storage apparatus, configured to store one or more programs, wherein when the one or more programs are executed by the one or more processors, the one or more processors are enabled to implement following actions:

receiving one or more first digital currencies, which belong to the second currency management apparatus and are sent by one or more first currency management apparatuses different from the second currency management apparatus, wherein the one or more first digital currencies are digital currencies that are received by a client during offline transaction, and the one or more first digital currencies are sent to the one or more first currency management apparatuses once the first client establishes a communication connection with the one or more first currency management apparatuses, each of the one or more first digital currencies is configured with a circulation identifier, an identifier of the second currency management apparatus, a signature of the second currency management apparatus, and a transaction voucher; and verifying the one or more first digital currencies, and recording one or more verification results;

wherein the one or more first digital currencies are verified according to their circulation identifiers, their identifiers, their signatures, their transaction vouchers, and their denominations, the transaction vouchers indicate transaction information corresponding to the one or more first digital currencies, and the signatures are generated by using an asymmetric encryption algorithm;

wherein verifying the one or more first digital currencies further comprises:

calculating a first sum of denominations of the one or more first digital currencies, and determining whether the first sum is consistent with a second sum of denominations of one or more digital currencies that are recorded by the second currency management apparatus and have same circulation identifiers as the one or more first digital currencies, so as to identify a problem of double payments of the one or more first digital currencies; and verifying whether the circulation identifiers are valid, verifying whether the identifiers belong to a legitimate second currency management apparatus, and verifying the signatures using a public key of the second currency management apparatus.

12. A non-transitory medium, having a computer program stored thereon, wherein when the computer program is executed by a processor, the processor is enabled to implement following actions:

receiving one or more first digital currencies, which belong to the second currency management apparatus and are sent by one or more first currency management apparatuses different from the second currency management apparatus, wherein the one or more first digital currencies are digital currencies that are received by a client during offline transaction, and the one or more first digital currencies are sent to the one or more first currency management apparatuses once the first client establishes a communication connection with the one or more first currency management apparatuses, each of the one or more first digital currencies is configured with a circulation identifier, an identifier of the second currency management apparatus, a signature of the second currency management apparatus, and a transaction voucher; and verifying the one or more first digital currencies, and recording one or more verification results;

wherein the one or more first digital currencies are verified according to their circulation identifiers, their identifiers, their signatures, their transaction vouchers, and their denominations, the transaction vouchers indicate transaction information corresponding to the one or more first digital currencies, and the signatures are generated by using an asymmetric encryption algorithm;

wherein verifying the one or more first digital currencies further comprises:

calculating a first sum of denominations of the one or more first digital currencies, and determining whether the first sum is consistent with a second sum of denominations of one or more digital currencies that are recorded by the second currency management apparatus and have same circulation identifiers as the one or more first digital currencies, so as to identify a problem of double payments of the one or more first digital currencies; and verifying whether the circulation identifiers are valid, verifying whether the identifiers belong to a legitimate second currency management apparatus, and verifying the signatures using a public key of the second currency management apparatus.

* * * * *